United States Patent
Jensen et al.

(10) Patent No.: US 12,442,511 B2
(45) Date of Patent: Oct. 14, 2025

(54) COLOR CONTROL IN LIGHT FIXTURE WITH SUBTRACTIVE COLOR MIXING SYSTEM AND ADDITIONAL FILTER

(71) Applicant: HARMAN PROFESSIONAL DENMARK APS, Aarhus (DK)

(72) Inventors: Frank Kjaer Jensen, Skødstrup (DK); Kasper Nielsen, Brabrand (DK)

(73) Assignee: Harman Professional Denmark Aps, Aarhus N (DK)

( * ) Notice: Subject to any disclaimer, the term of this patent is extended or adjusted under 35 U.S.C. 154(b) by 49 days.

(21) Appl. No.: 17/525,001

(22) Filed: Nov. 12, 2021

(65) Prior Publication Data

US 2023/0151947 A1 May 18, 2023

(51) Int. Cl.
*F21V 9/40* (2018.01)
*F21S 10/00* (2006.01)
(Continued)

(52) U.S. Cl.
CPC ............. *F21V 9/40* (2018.02); *F21V 14/006* (2013.01); *F21V 23/0457* (2013.01);
(Continued)

(58) Field of Classification Search
CPC .... F21V 23/0457; F21V 14/006; F21V 14/08; F21V 14/085; F21V 9/00; F21V 9/08; F21V 9/083; F21V 9/20; F21V 9/40; F21V 13/08; F21V 13/14; F21V 14/00; F21W 2131/406; F21S 10/007; F21S 10/02;
(Continued)

(56) References Cited

U.S. PATENT DOCUMENTS 5,839,807 A * 11/1998 Perlo .................... F21V 9/08
                                                353/38
10,111,295 B1 * 10/2018 Belliveau ............... H05B 45/10
(Continued)

FOREIGN PATENT DOCUMENTS

DE     102017100902 A1 * 7/2018  ............... F21K 9/64
WO     20100145658 A1    12/2010

OTHER PUBLICATIONS

Machine translation of DE 102017100902 A1 retrieved from the FIT database of PE2E search. (Year: 2023).*

*Primary Examiner* — Colin J Cattanach
(74) *Attorney, Agent, or Firm* — Artegis Law Group, LLP

(57) ABSTRACT

A method for controlling a subtractive color mixing system in a light fixture, comprising a light source, the subtractive color mixing system comprising a plurality of subtractive color filters, and an additional filter. The method is for emitting light having a target color upon having traversed the additional filter, such as upon having traversed the subtractive color mixing system and the additional filter and optionally being emitted from the light fixture. The method comprising receiving target information indicative of, such as defining, the target color, calculating a target control setpoint for each subtractive color filter within the plurality of subtractive color filters based on the target information, and calibration data, which for a plurality of sets of calibration control setpoints is indicative of an emitted color, controlling each of the subtractive color filters according to each calculated target control setpoint for each of the subtractive color filters.

17 Claims, 6 Drawing Sheets

(51) Int. Cl.
| | |
|---|---|
| *F21S 10/02* | (2006.01) |
| *F21V 9/00* | (2018.01) |
| *F21V 9/08* | (2018.01) |
| *F21V 9/20* | (2018.01) |
| *F21V 13/08* | (2006.01) |
| *F21V 13/14* | (2006.01) |
| *F21V 14/00* | (2018.01) |
| *F21V 14/08* | (2006.01) |
| *F21V 23/04* | (2006.01) |
| *F21W 131/406* | (2006.01) |
| *G01J 3/50* | (2006.01) |
| *H05B 31/00* | (2006.01) |
| *H05B 45/20* | (2020.01) |
| *H05B 45/22* | (2020.01) |
| *H05B 47/105* | (2020.01) |
| *H05B 47/17* | (2020.01) |

(52) U.S. Cl.
CPC .............. *F21S 10/007* (2013.01); *F21S 10/02* (2013.01); *F21S 10/026* (2013.01); *F21V 9/00* (2013.01); *F21V 9/08* (2013.01); *F21V 9/083* (2013.01); *F21V 9/20* (2018.02); *F21V 13/08* (2013.01); *F21V 13/14* (2013.01); *F21V 14/00* (2013.01); *F21V 14/08* (2013.01); *F21V 14/085* (2013.01); *F21W 2131/406* (2013.01); *G01J 3/505* (2013.01); *H05B 31/0036* (2013.01); *H05B 45/20* (2020.01); *H05B 45/22* (2020.01); *H05B 47/105* (2020.01); *H05B 47/17* (2020.01)

(58) Field of Classification Search
CPC ..... F21S 10/026; H05B 47/105; H05B 47/17; H05B 45/20; H05B 45/22; H05B 31/0036; G01J 3/505
See application file for complete search history.

(56) References Cited

U.S. PATENT DOCUMENTS

| | | | | |
|---|---|---|---|---|
| 10,156,350 | B1* | 12/2018 | Belliveau | F21V 23/0435 |
| 11,221,125 | B2* | 1/2022 | Gadegaard | F21V 23/0457 |
| 2018/0283632 | A1* | 10/2018 | Rasmussen | G03B 21/001 |
| 2018/0368217 | A1* | 12/2018 | Toft | F21S 10/02 |
| 2019/0219249 | A1* | 7/2019 | David | H05B 45/20 |
| 2021/0356095 | A1* | 11/2021 | Gadegaard | F21V 23/0457 |
| 2022/0228727 | A1* | 7/2022 | Jurik | F21V 9/08 |

* cited by examiner

COLOR CONTROL IN LIGHT FIXTURE WITH SUBTRACTIVE COLOR MIXING SYSTEM AND ADDITIONAL FILTER

TECHNICAL FIELD

The present disclosure relates to a method for controlling a subtractive color mixing system in a light fixture and more particularly relates to a method for controlling a subtractive color mixing system of a light fixture with an additional filter and based on calibration data, and furthermore relates to a corresponding control device, light fixture system and method of manufacture.

BACKGROUND

Light fixtures may be utilized for creating various light effects and/or mood lighting in connection with, e.g., concerts, live shows, TV shows, sport events or as architectural installation light fixtures creating various effects.

Light fixtures may be costly, imprecise in terms of emitted color and inconsistent, such as differing in properties (such as emitted color(s)) across different light fixtures, which may in particular be an issue for light fixtures comprising a filter, such as a subtractive color mixing system and an additional filter.

Hence, an improved method for controlling a light fixture and more particularly a method for controlling a subtractive color mixing system in a light fixture with an additional filter, for enabling less costly light fixtures and/or for enabling increased consistency across light fixtures and a corresponding control device, light fixture system and method of manufacture, would be advantageous.

SUMMARY

It may be seen as an object of the present disclosure to provide a method for controlling a subtractive color mixing system in a light fixture and a corresponding control device, light fixture system and method of manufacture for enabling less costly light fixtures and/or for enabling increased consistency across light fixtures. It is a further object of the present disclosure to provide an alternative to the prior art.

Thus, the above described object and several other objects are intended to be obtained in a first aspect of the disclosure by providing a method for controlling a subtractive color mixing system in a light fixture, wherein
the light fixture comprises
a light source, and
the subtractive color mixing system, which comprises
a plurality of subtractive color filters, and
an additional filter,
and wherein the method is for emitting light having a target color upon having traversed the additional filter, such as upon having traversed the subtractive color mixing system and the additional filter and optionally being emitted from the light fixture, said method comprising:
receiving target information indicative of, such as defining, the target color,
calculating a target control setpoint for each subtractive color filter within the plurality of subtractive color filters based on:
the target information, and
calibration data, which for a plurality of sets of calibration control setpoints is indicative of an emitted color,
controlling each of the subtractive color filters according to each calculated target control setpoint for each of the subtractive color filters.

The disclosure may be particularly, but not exclusively, advantageous for taking into account calibration data, which can take into account non-linear characteristics of the color filters and/or deviations from nominal characteristics (i.e., being different from, e.g., characteristics provided or estimated by a manufacturer) and furthermore enables taking into account optical properties, such as a color or spectral information, of the additional filter. This may in turn be advantageous for enabling utilizing one or more optical components with larger tolerances (which may in turn be advantageous for a number of reasons, such as such optical components being relatively less costly, sourcable from more manufacturers, and/or sourcable with shorter times of delivery), such as one or more light sources, one or more color filters (and/or color filters less demanding to manufacture), and/or one or more additional filters, where tolerances, such as production tolerances, are relatively higher and where the characteristics, such as the optical characteristics, consequently vary to a larger degree and still be able to emitting light with a color identical to or relatively close to the target color. Another possible advantage may be that this may in turn enable emitting light with a color closer to the target color. Another possible advantage may be that this may in turn enable emitting light with a color closer to the target color, such as enabling increased consistency across light fixtures.

A possible advantage may be that a complicated interplay between the additional filter and/or the subtractive color mixing system and the light source, can be taken into account. For example, a light source may have a spectra giving a certain color and the additional filter may have another spectra giving another certain color. However, small changes in spectra (such a being within production tolerances) of the light source (such as a change in spectrum from one light source to another light source, where the light sources are nominally identical and/or emits identical colors) and/or the additional filter (such as a change in spectrum from one additional filter to another additional filter where the additional filters are nominally identical and/or emits identical colors under certain conditions) may yield surprisingly large deviations in a resulting color of light emitted from the light source via the additional filter, and this may even be the case where the color of each of the light source and the additional filter are within acceptable tolerances. One insight is that the surprisingly large deviation may be due to, e.g., a peak in one spectra, such as for an LED light source, can overlap with a cut-off frequency, such as of the additional filter, so that even minor variations in spectral position of peak and/or cut-off frequency might lead to a significant change in resulting color of light emitted from the light source via the additional filter (when comparing light fixtures with different combinations of nominally similar light sources and additional filters). A technical effect of calculating and controlling based on calibration data may be that it nevertheless enables emitting light having a target color upon having traversed the additional filter The term "light fixture" is generally understood to refer to an electrical device that contains an (electrical) light source, such as an illumination system with a light source, that provides illumination and wherein the light source and optionally one or more optical components is at least partially enclosed in a housing. The person skilled in (entertainment) light fixtures realizes that a number of light effects can be integrated into the light fixture. According to embodiments, there is presented a light fixture with one or more of a prism for prism effects, an iris for iris effects, framing blades for framing effects, frost filter for frost effects, means for dimming effects, animation wheel for animation effects, one or more gobo wheels. The (entertainment) light fixture can be controlled based on an input signal indicative of a desired intensity, light parameters which can be indicative of a target color indicating a desired color of the outgoing light, and/or a number of light effect parameters indicative of a various numbers of light effects. The (entertainment) light fixture may comprise a processor configured to control the different light effects of the light fixture based on the light parameters received by the input signal. For instance the (entertainment) light fixture may comprise the light effects and be controlled based on various parameters as described in WO2010/145658 in particular on page 4 line 11-page 6 line 9, which is incorporated by reference herein.

The term "light" is generally understood to refer to visible electromagnetic radiation, such as electromagnetic radiation with wavelengths within (both endpoints included) 380-780 nm.

The term "a subtractive color mixing system" is generally understood to refer to a system for partially or fully inhibiting conveying, such as transmitting (along the optical path) or reflecting (along the optical path), spectral parts of incident light, i.e., subtracting partially or fully one or more certain spectral parts (corresponding to the spectral parts not conveyed along the optical path). In embodiments, the one or more subtractions are realized by inserting, such as gradually inserting, one or more, such as three or more, such as four or more, subtractive color filters into the optical path, such as wherein the subtractive color mixing system is arranged for inserting independently of each other three subtractive tristimulant color filters in varying degrees (such as the subtraction being in varying degrees, such as gradually increasing degrees) into the optical path. According to an embodiment, a filter set of three primary colors (with colors being the transmitted colors in case of incident white light) is arranged to perform such color mixing, such as red, green and blue color filters (RGB) or cyan, magenta and yellow color filters (CMY).

The term "additional filter" is generallyl understood to refer to an optionally adjustable filter in the light fixture in addition to the subtractive color filters of the subtractive color mixing system, such as a filter for changing the color, the color temperature or (improving) the color rendering index.

The term "gamut" is generally understood to refer to a subset of (all) colors which can be accurately represented in a given circumstance, such as within a given color space, such as with the subtractive color mixing system.

The term "subtractive color filter" is understood as is common in the art, such as a color filter which can be qualitatively or quantitatively inserted into a light beam and prohibit transmission of some or all light in the light beam within a certain range of wavelength, while allowing light having other wavelengths to pass (at least to a larger degree). In embodiments, the subtractive color mixing system comprises one or more subtractive color filters in the form of dichroic filters. In high intensity light projectors such as are used for example in the entertainment and architectural lighting industries, the brightness of the light sources required is too high to use absorptive color filters for coloring the light beam. So called dichroic filters are used instead which reflect the complementary color of color passed through the filter. Such filters display an extremely small absorption and are able to withstand the high ambient temperature and high intensity light throughput which are characteristic of such projectors. It may in general be understood that each of the subtractive color filters, such as within the plurality of subtractive color filters, is adjustable, such as quantitatively adjustable.

The term "emitting light" is generally understood to refer to emitting light from the light fixture or a part thereof, such as emitting light from a part (only) of the light fixture comprising the subtractive color mixing system and the additional filter (and not necessarily having traversed other optical components of the light fixture), and optionally emitting light from the light fixture (such as leaving the light fixture in entirety).

The term "a target color" is generally understood to refer to a color which is to be targeted by light having traversed the additional filter, such as the subtractive color mixing system and the additional filter and optionally being emitted from the light fixture, such as a color desired by a user (such as the desired color defining a target color to be aimed at during control of the light fixture in pursuit of emission of a color similar or identical to the desired target color). The color may be defined with reference to a chromaticity and chromaticity (coordinate) system, such as the CIE (Commission internationale de l'eclairage) 1931 color space.

The term "receiving target information" is generally understood to refer to receiving any form of user input, such as adjustment via physical controls, such as knobs or keyboards, or analog or digital signals, such as a digitally input chromaticity and chromaticity coordinate in the CIE 1931 color space.

The term "target information indicative of the target color" is generally understood to mean that the target information enables deriving the target color, such as the target information defining directly the target color (e.g., target information being a coordinate in the CIE 1931 color space) or defining indirectly the target color (e.g., target information being a spectrum of electromagnetic radiation enabling deriving a corresponding target color).

The term "control setpoint" is generallly understood to refer to a value set by a controller for controlling a color filter of the subtractive color mixing system, for example "+5 Volt" applied to an actuator controlling a position of a color filter in a feed-forward control scheme or "30 mm" in a feed-back control scheme.

The term a controller (also referred to as a control device) is generally understood to refer to a device, such as a processor, capable of being operatively connected with a light fixture and controlling the light fixture. For example, the controller can be operatively connected to, e.g., power supply to light sources and/or one or more actuators for controlling a subtractive color mixing system.

The term "calibration control setpoint" is generally understood to refer to a control setpoint which has been used for calibration, such as control setpoints set by a control device during calibration for which a corresponding color of light emitted from the light fixture or a part thereof when each subtractive color filter is controlled according to the respectice calibration control setpoint is measured and stored together with the calibration control setpoint. It may be understood that "emitted color" in the calibration data may be obtained for the light fixture in entirety and/or one or more parts thereof. For example, the emitted color can be obtained for the subtractive color mixing system only, for the subtractive color mixing system and the additional filter only, and/or for the subtractive color mixing system and the additional filter and one or more other optical components, such an optical component in the form of a lens system.

The term "set of control setpoints" is generally understood to refer to a set of values for controlling a corresponding set of color filters.

The term "calibration data" is generally understood to refer to data, such as measured data, with corresponding values of on the one hand sets of control setpoints and on the other hand colors and/or spectra (of light emitted by the subtractive color mixing system, the subtractive color mixing system and the additional filter, and optionally emitted from the light fixture). The calibration data may be non-linear, such as the relationship between on the one hand control setpoint and/or position of a filter and on the other hand color value being non-linear. The calibration data for an optical system or component may be understood to be specific, such as for example calibration data for an optical component, such as the additional filter, being specific for that optical component.

The term "target control setpoint" is generally understood to refer to a value which should be targeted, e.g., by a control device, in pursuit of a target color.

In embodiments, the method may further comprise a step of optimization (such as fine tuning) subsequent to controlling each of the subtractive color filters according to each calculated target control setpoint for each of the subtractive color filters, such as for the purpose of reducing any difference in a color of light emitted by the light fixture and the target color.

According to an embodiment, there is presented a method wherein for one or more or all of the sets of calibration control setpoints, the emitted color, such as the emitted color of the calibration data, is defined by light having traversed the additional filter, such as light having travesed the subtractive color mixing system and the additional filter and optionally being emitted from the light fixture. According to this embodiment, for at least one calibration control setpoint, the emitted color of the calibration data is defined by light having traversed the additional filter. This may be advantageous for enabling taking into account the actual optical properties (e.g., possible including deviations from nominal values, etc.) of the additional filter into account.

According to an embodiment, there is presented a method wherein for one or more or all of the sets of calibration control setpoints, the emitted color, such as the emitted color of the calibration data, is based on light not having traversed the additional filter, such as light having traversed the subtractive color mixing system and not having traversed the additional filter. A possible advantage of this may be that in order to achieve a target color of light having traversed the additional filter, it may be possible to exploit calibration data based on light not having traversed the filter. This may in turn enable obtaining calibration data without the additional filter, which may be easier and/or may be advantageous for also being (more) useful for targeting colors during use of the light fixture where the additional filter is not traversed. For example, instead of necessarily providing calibration data (optionally exclusively) based on light having traversed the additional filter (for the purpose of targeting a color of light emitted via the additional filter), it is possible to (re-)use calibration data obtained without the additional filter to get the targeted color when emitting light via the additional filter. This may be possible, e.g., in case at least one calibration data point is obtained with the additional filter A possible advantage of this (i.e., a method wherein for one or more or all of the sets of calibration control setpoints, the emitted color, such as the emitted color of the calibration data, is based on light not having traversed the additional filter) may be that it enables relying on calibration data obtained for the light fixture exclusively without the additional filter and then supplementing with further calibration data obtained for light having traversed the additional filter (without having traversed the subtractive color mixing system or having traversed both the subtractive color mixing system and having traversed the additional filter). This may for example be beneficial for retrofitting an additional filter onto a light fixture for which calibration data has already been established without the additional filter. By supplementing calibration data obtained exclusively for the the subtractive color mixing system with calibration data obtained for the additional filter, an advantage might be that it enables taking into account deviations from nominal values.

According to an embodiment, there is presented a method, wherein
for a plurality of the sets of calibration control setpoints, the emitted color, such as the emitted color of the calibration data, is based on light not having traversed the additional filter, such as light having traversed the subtractive color mixing system and not having traversed the additional filter, and
for one or more of the sets of calibration control setpoints, the emitted color, such as the emitted color of the calibration data, is defined by light having traversed the additional filter, such as light having traversed the subtractive color mixing system and the additional filter and optionally light being emitted from the light fixture.

A possible advantage may be that data obtained for the light fixture without the additional filter may be relied upon (which may be beneficial for utilizing existing data and/or for relying on data which is also applicable for targeting colors without the additional filter), and furthermore data obtained with the additional filter may (also) be relied upon, which may be beneficial for taking into account the optical properties of the additional filter and the interplay with one or more other components of the light fixture, such as the light source. For example, calibration data without the additional filter may "map" the color space with respect to the control setpoints enabling shifting the color with a desired amount and, e.g., a single set of calibration control setpoints in combination with the additional filter provides the relevant knowledge about the additional filter and the interplay with the remainder of the light fixture, which information in total enables shifting the color of light emitted via the additional filter to a desired target color.

According to an embodiment, there is presented a method, wherein
for a plurality of the sets of calibration control setpoints, the emitted color, such as the emitted color of the calibration data, is based on light having traversed the subtractive color mixing system and not having traversed the additional filter, and
for one or more of the sets of calibration control setpoints, the emitted color, such as the emitted color of the calibration data, is defined by light having traversed the additional filter and not having traversed the subtractive color mixing system, and optionally being emitted from the light fixture.

According to this embodiment, the calibration data is based both on the one hand light having traversed the subtractive color mixing system and not the additional filter and on the other hand on light having traversed the additional filter and not the subtractive color mixing system. This may be advantageous for enabling calibration of each of the subtractive color system and the additional filter separately from each other (and optionally both with the same light source of the light fixture). This may furthermore be advantageous for providing a particularly simple solutions, e.g., due to the enabling calculating the target control setpoints with respect to a set of control setpoints, where each control setpoint corresponds to substantially zero, such as zero, subtraction of light by the corresponding subtractive color filter.

According to an embodiment, there is presented a method, wherein the emitted color, such as the emitted color of the calibration data, such as all the calibration data, is defined by light having traversed the subtractive color mixing system and the additional filter, such as light being emitted from the light fixture. By relying on calibration data based on light having subtractive color system and the additional filter, a simple method is provided for enabling targeting a color emitted via the additional filter.

According to an embodiment, there is presented a method wherein the method further comprises:
  obtaining calibration data (such as repeatedly obtaining calibration data), wherein said obtaining calibration data comprises, for one or more sets of calibration control setpoints comprising a calibration control setpoint for each subtractive color filter, and wherein said obtaining calibration data comprises:
  controlling each subtractive color filter according to a respective calibration control setpoint,
  measuring color of light emitted from the subtractive color mixing system, the subtractive color mixing system and the additional filter, and optionally emitted from the light fixture, when each subtractive color filter is controlled according to the respectice calibration control setpoint,
  storing corresponding values of:
    the set of calibration control setpoints, and
    the color of light emitted from the subtractive color mixing system, the subtractive color mixing system and the additional filter, and optionally emitted from the light fixture, when each subtractive color filter is controlled according to the respectice calibration control setpoint.

According to this embodiment, calibration data may be obtained by physically controlling, such as positioning, color filter(s) and measuring corresponding spectral information. The measurement setup could comprise an, optionally portable (such as comprising handles and/or shock-absorption elements and/or features for changing a size, such as features for reversibly disassembling and reassembling), integrating sphere and a spectrometer. An advantage of thise embodiment may be that it ensures taking into account the true characteristics of color filter(s) alone or in combination (and optionally in combination with the additional filter) and/or of a light source of the light fixture for providing incident light to the subtractive color mixing system. Another possible advatange may be that obtaining calibration data can be used for updating calibration data, which may be relevant, e.g., due to drift or exchange of parts. According to this embodiment, color of emitted light is determined and stored, such as stored in the light fixture, e.g., in a electronically readable memory unit in the light fixture.

The above mentioned step of obtaining calibration data may be carried out as an embodiment of the disclosure and/or as a separate independent step.

The term "measuring color of light emitted from the subtractive color mixing system, the subtractive color mixing system and the additional filter, and optionally emitted from the light fixture, when each subtractive color filter is controlled according to the respectice calibration control setpoint" can refer to measuring color (directly) with a color meter (such as in a point or with an integrating sphere).

The term "measuring color of light emitted from the subtractive color mixing system, the subtractive color mixing system and the additional filter, and optionally emitted from the light fixture, when each subtractive color filter is controlled according to the respectice calibration control setpoint" can alternatively refer to measuring color (indirectly) by:
  measuring spectral information (such as with a spectrometer, such as in a point or with an integrating sphere.) of light emitted from the subtractive color mixing system, the subtractive color mixing system and the additional filter, and optionally emitted from the light fixture, when each subtractive color filter is controlled according to the respectice calibration control setpoint,
  determining based on the spectral information a color of light emitted from the subtractive color mixing system, the subtractive color mixing system and the additional filter, and optionally emitted from the light fixture, when each subtractive color filter is controlled according to the respectice calibration control setpoint.

In any case, the embodiment may comprise measuring color (directly) and storing color or measuring color (indirectly) by measuring spectral information and storing (calculated) color and/or spectral information.

According to an embodiment, there is presented a method wherein the method further comprises:
  obtaining calibration data (such as repeatedly obtaining calibration data), wherein said obtaining calibration data comprises, for one or more sets of calibration control setpoints comprising a calibration control setpoint for each subtractive color filter, and wherein said obtaining calibration data comprises:
  controlling each subtractive color filter according to a respective calibration control setpoint,
  measuring spectral information of light emitted from the subtractive color mixing system, the subtractive color mixing system and the additional filter, and optionally emitted from the light fixture, when each subtractive color filter is controlled according to the respectice calibration control setpoint,
  storing corresponding values of:
  the set of calibration control setpoints, and
  the spectral information of light emitted from the subtractive color mixing system, the subtractive color mixing system and the additional filter, and optionally emitted from the light fixture, when each subtractive color filter is controlled according to the respectice calibration control setpoint.

This embodiment may be considered similar to the preceding embodiment, albeit the spectral information rather than colors is stored, and the same advantages may apply. It may be combined with the preceding embodiment so that both colors and spectral information is stored. An advantage of storing spectral information may be that it enables exchanging parts, such as one or more color filters and/or a lamp for providing incident light, while still being able to benefit from the knowledge of the characteristics of the remaining parts for which spectral information has been obtained and stored.

The above mentioned step of obtaining calibration data may be carried out as an embodiment of the disclosure and/or as a separate independent step.

According to an embodiment, there is presented a method, wherein the calibration data comprises a number N of sets of calibration control setpoints being 1 or more.

According to an embodiment, there is presented a method, wherein the calibration data comprises a number N of sets of calibration control setpoints (such as each calibration control set point being associated with a different color point than the other calibration control setpoint(s)) being 2 or more, such as 3 or more, such as 4 or more, such as 5 or more, such as 6 or more, such as 8 or more, such as 10 or more, such as 30 or more, such as 100 or more, such as 200 or more, such as 300 or more, such as 500 or more, such as 750 or more, such as 1000 or more. An advantage of using more points may be that it enables an improved resolution in a color space, such as so that a typical or maximum distance between a measured point and a target color becomes relatively smaller, such as improved resolution of the non-linearity to provide higher precision in a color space.

According to a further embodiment there is presented a method wherein the plurality of sets of calibration control setpoints comprises a set of calibration control setpoints, where each calibration control setpoint corresponds to substantially zero, such as zero, subtraction of light by the corresponding subtractive color filter. According to this embodiment, there may be substantially zero, such zero, subtraction from each filter, i.e., the corresponding data point is representative of the incident light, such as light from the light source or lamp of the light fixture This may allow for the data, such as the measurements, to be split into contributions coming from the light source and from the color filter(s).

According to another further embodiment there is presented a method wherein the plurality of sets of calibration control setpoints comprises, for each of a plurality of subtractive color filters, a set of calibration control setpoints where:
the calibration control setpoint for the subtractive color filter corresponds to non-zero, such as substantial, subtraction of light, and
the calibration control setpoint for all other subtractive color filters within the plurality of subtractive color filters corresponds to substantially zero, such as zero, subtraction of light.

According to this embodiment, there may be substantially zero, such zero, subtraction from all color filters, except one color filter, i.e., the corresponding data point is representative of the incident light and the influence of subtraction from only the one color filter. This may allow for these data, such as these measurements, to act as interface between different color gamut regions.

According to another further embodiment there is presented a method wherein the plurality of sets of calibration control setpoints comprises, one or more sets of mixed calibration control setpoints wherein:
a plurality, such as comprising of two or consisting of two, of calibration control setpoints each corresponds to non-zero, such as substantial, subtraction of light.

According to this embodiment, there may be substantially zero, such zero, subtraction from more than one, such as two, such as two and only two, color filters, i.e., the corresponding data point is representative of the incident light and the influence of subtraction from multiple, such as two and only two, color filters. This may be beneficial for improving resolution of calibration data points in a color space, which may in turn be beneficial for the possibility of accurately generating emitted light with having a (desired) target color, even if the target colors is not identical to a color of a calibration data point.

According to a further embodiment there is presented a method wherein the plurality of sets of calibration control setpoints comprises a plurality of mixed calibration control setpoints wherein:
a plurality, such as comprising of two or consisting of two, of calibration control setpoints each corresponds to non-zero, such as substantial, subtraction of light.
and wherein
corresponding colors of light emitted from the light fixture according to the plurality of sets of mixed calibration control setpoints have different distances in a color space, such as the CIE 1931 color space, with respect to a color for which each setpoint corresponds to substantially zero, such as zero, subtraction of light by the corresponding subtractive color filter.

According to this embodiment, the calibration data may comprise a plurality of mixed calibration control setpoints, where multiple, such as two and only two, color filters are inserted into the optical path, and wherein the resulting colors have color points with different distances with respect to the color point of the light source (with no color filters inserted). An advantage of this may be that it may be beneficial for improving resolution of calibration color points in a color space.

According to a further embodiment there is presented a method wherein for the sets of mixed calibration control setpoints with corresponding emitted colors at different distances in a color space, the same two calibration control setpoints are non-zero, such as where only these two calibration control setpoints are non-zero. According to this embodiment, the resulting colors having different distances from the color point of the light source (with no color filters inserted) are placed in a color space, such as the CIE 1931 color space, between lines drawn between points with only one color filter inserted in the optical path. An advantage of this may be that it may be beneficial for improving resolution of calibration data points in a color space.

According to an embodiment, there is presented a method wherein calculating the target control setpoint for each subtractive color filter within the plurality of subtractive color filters comprises interpolating between sets of calibration control setpoints. The term "interpolating" is generally understood to refer to estimating a target control setpoint for a target color from one or more control setpoints for colors on at least two sides of the target color in a color space, such as the CIE 1931 color space. An advantage of this may be that it enables estimating a target control setpoint even in the absence of a corresponding control setpoint in the calibration data.

According to an embodiment, there is presented a method comprising
point set mesh generation within a color space based on the calibration data, such as wherein calibration data points (such as color points corresponding to sets of calibration control setpoints) form vertices,
determining a mesh polygon, such as the smallest mesh polygon, comprising the target color, such as by optionally repeatedly applying a method for determining if the target color is within a mesh polygon,
interpolating, such as interpolating within the mesh polygon based on the vertices of the mesh polygon, so as to achieve target control setpoints.

According to a further embodiment, the point set mesh generation is a point set triangulation.

According to a further embodiment, the point set mesh generation results in quadrilateral (four-sided) polygons. The math provides an analytical solution for a polygon with four points (e.g., for filters A and B and a quadrilateral polygon with the corners, A+B out, A in, B in, A+B in).

According to an alternative embodiment, there is presented a method wherein calculating the target control setpoint for each subtractive color filter within the plurality of subtractive color filters comprises a meshfree method. The term "meshfree method" is generally understood to refer a method that does not require connection between nodes of the simulation domain, i.e. a mesh, but is, e.g., based on interaction of each node with some or all of its neighbors, such as using a nearest neighbour interpolation and or using smoothed-particle hydrodynamics (SPH).

According to an embodiment there is presented a method wherein for one or more or all of the sets of calibration control setpoints, the emitted color, such as the emitted color of the calibration data, is defined by light having traversed the subtractive color mixing system and/or the additional filter, and originating from the light source. This may be advantageous for taking into account the interplay between the light source and the subtractive color mixing system and/or the additional filter. For example, different light sources may be nominally identical (e.g., same product codes) and emit identical colors and similarly different additional filters may be nominally identical (e.g., same product codes) and emit identical colours (with some light sources), but in combination, e.g., due to differences in spectra a resulting color of light emitted from the light source via the additional filter may vary between light sources or additional filters. However, this can be taken into account with the embodiment wherein for one or more or all of the sets of calibration control setpoints, the emitted color, such as the emitted color of the calibration data, is defined by light having traversed the subtractive color mixing system and/or the additional filter, and originating from the light source.

According to an embodiment there is presented a method wherein the method is for emitting light having a target color upon having traversed the subtractive color mixing system and the additional filter and optionally being emitted from the light fixture. According to this embodiment, the target color is emitted upon having traversed both the subtractive color mixing system and the additional filter, such as the resulting light being affected, such as coloured, by the combination of the subtractive color mixing system and the additional filter. A possible advantage of this embodiment is, that not only is the subtractive color mixing system or the additional filter taken into account, but the combination of the subtractive color mixing system and the additional filter is taken into account, such as the specific combination, such as taking into account any production tolerances of the combination.

According to a second aspect of the disclosure, there is presented a control device for controlling a subtractive color mixing system in a light fixture, wherein
  the light fixture is comprising
    a light source,
    the subtractive color mixing system, which comprises a plurality of subtractive color filters,
    and wherein the light fixture further comprises an additional filter,
  and wherein the control device is arranged for:
    receiving target information indicative of, such as defining, a target color, such as said target color being representative of a desired color of light upon having traversed the additional filter, such as upon having traversed the subtractive color mixing system and the additional filter and optionally being emitted from the light fixture,
    calculating a target control setpoint for each subtractive color filter within the plurality of subtractive color filters based on:
      the target information, and
      calibration data, which for a plurality of sets of calibration control setpoints is indicative of an emitted color,
    outputting calculated target control setpoints enabling controlling each of the subtractive color filters according to each calculated target control setpoint for each of the subtractive color filters.

The control device may be operationally connected and optionally physically connected (such as within a light fixture) with the subtractive color mixing system. The control device may be embedded electronics, such as processor and memory and input/output (IO) system(s).

According to an embodiment, there is presented a control device further comprising or being operationally connected to:
  a storage unit and comprising information corresponding to the calibration data.

The storage unit may be a unit comprising a suitable medium, such as a computer readable medium, such as an electronically accessible memory integrated circuit chip, such as an optical storage medium or a solid-state medium, such as an optical storage medium or a solid-state medium supplied together with or as part of other hardware, such as a Hard Disk Drive (HDD).

According to a third aspect there is presented a light fixture system comprising:
  a light fixture comprising
    a light source,
    a subtractive color mixing system, wherein the subtractive color mixing system comprises a transducer for controlling the subtractive color filters upon receipt of target control setpoints,
    an additional filter, and
    a control device according to the second aspect, wherein the control device is operationally connected to the subtractive color mixing system and arranged for controlling the subtractive color mixing system by outputting calculated target control setpoints to the transducer controlling respective subtractive color filters.

According to an embodiment there is presented a light fixture wherein the additional filter is selected as any of the following:
  a color-temperature-compensation (CTC) filter, such as
    a color-to-orange (CTO) filter, such as a quantitatively adjustable color-to-orange (CTO) filter, or
    a color-to-blue (CTB) filter, such as a quantitatively adjustable color-to-blue (CTB) filter,
  a color-rendering index (CRI) enhancement filter, or
  a color filter.

A color-temperature-compensation filter (CTC) can for example be advantageous for enabling varying the color temperature, such as of (initially) white light. A color-temperature-compensation filter may in an alternative formulation be known as a color-temperature-correction filter. In general, a color-temperature-compensation filter, is a filter which enables changing a color-temperature of light traversing the filter, such as enables in, e.g, a CIE colour space, substantially moving a coordinate of light from one coordinate substantially on the black-body curve to another coordinate on the black-body curve. Depending on the direction on the black-body curve a color coordinate is moved by a color-temperature-compensation (CTC) filter, it may in embodiments be referred to as a color-to-orange (CTO) filter (towards lower temperatures) or a color-to-blue (CTO) filter (towards higher temperatures).

A color-rendering-index-(CRI) enhancement filter can for example be advantageous for improving a color rendering index, such as of white light. A color-rendering-index enhancement-filter may in an alternative formulation be known as a spectral enhancement filter, a color rendering index (CRI) filter or a color rendering enhancement filter. By CRI may be understood the CIE Ra value such as the international standard color rendering index.

A color filter can for example be advantageous for yielding a certain, e.g., saturated, color. Theoretically, any color in the gamut can be produced by combining, e.g., the subtractive (e.g., CMY) color filters to a varying degree. As an example, should a pale green color be desired, a combination of cyan and yellow filters would be used to partially cover the output from a white light source. The degree to which the aperture is partially filled by a particular filter (and thus the degree of paleness of the color attained) is the parameter known as the saturation. For example (theoretically) a fully saturated red would be achieved by the addition of fully saturated magenta in combination with fully saturated yellow. In practice due to the characteristics of dichroic filters, fully saturated colors are difficult to achieve by the addition of two subtractive color filters. In an embodiment, in addition to the color filters for subtractive color mixing, the light fixture comprises a conventional color wheel with, e.g., red, green and blue (additional) filters mounted thereupon to achieve full saturation of these colors.

According to an embodiment, the light fixture comprises a plurality of additional filters. In such cases it is encompassed by aspects and embodiments of the present disclosure, that the method comprises (and/or the control device being arranged for) adjusting, such as quantitatively and/or qualitatively, a plurality of additional filters, such as in one embodiment moving one additional filter out of a light beam and another additional filter into the light beam or in another embodiment adding an another additional filter to the light beam, and in each case be arranged for targeting a colour of light with light having traversed whichever additional filter or combination of additional filters presently being traversed by light.

According to an embodiment there is presented a light fixture being arranged for subjecting at least some of the light emitted from the light fixture to phosphor conversion and/or wherein a light source in the light fixture is a light-emitting-diode. Phosphor conversion may be advantageous for improving the optical properties of the light. LEDs may be advantageous for yielding high-intensity light with relatively little energy input and/or relatively little heat generation, e.g., compared to incandescent lamps. Phosphor may furthermore be useful for taking into account differences in LED properties. However, while a certain color may be achieved this way, the underlying spectra may vary between light sources (having the same color), which, may cause problems upon combination with, e.g., an additional filter, which problems may nevertheless be mitigated, minimized or even reduced with the present disclosure. The term "subjecting at least some of the light emitted from the light fixture to phosphor conversion" is generally understood to indicate that light emitted from the light fixture has undergone phosphor conversion in the light fixture, such as for example the light source comprising, such as consisting of, one or more LEDs with a phosphor-converting element, arranged so that the light emitted from the light source has been subjected to phosphor conversion.

According to an embodiment there is presented a light fixture wherein the additional filter is adjustable, such as qualitatively adjustable, such as quantitatively adjustable, and wherein the control device (502) is arranged for outputting target control setpoints based on a setting of the additional filter. The term "adjustable" may be understood to indicate that an adjustable element can be moved between two or more positions where it is traversed to different degrees by light from the light source and exiting the light fixture, such as not being fixed. It may be understood that in embodiments, the light fixture system comprises an actuator for changing the position. In embodiments, an "adjustable" filter is understood to be qualitatively or binarily adjustable, such as the (additional) filter being in either one of two positions, such as either not traversed at all by the light or being traversed by all light. In other embodiments, an "adjustable" filter is understood to be quantitatively, such as discretely or continuously, adjustable, such as the (additional) filter being in any one of a number of positions exceeding two, such as at least 8, such as at least 64, such as at least 512, such as at least 4096, such ranging from not being traversed at all by the light to being traversed by all light.

According to an embodiment there is presented a light fixture system further comprises:
  a color meter or a spectrometer, wherein the light fixture is arranged for emitting light to the color meter or the spectrometer,
  (said color meter or spectrometer optionally comprising) an integrating sphere, wherein the light fixture is arranged for emitting light into an input port of the integrating sphere, such as wherein the emitted light is emitted to the color meter or the spectrometer via the integrating sphere,
  and wherein the control device is further arranged for, such as arranged for in a calibration mode,
    obtaining calibration data, wherein said obtaining calibration data comprises, for one or more sets of calibration control setpoints comprising a calibration control setpoint for each subtractive color filter,
    controlling each subtractive color filter according to a respective calibration control setpoint,
    measuring with the color meter or spectrometer, respectively, a color (such as measuring the color directly with the color meter or indirectly via the spectrum of the spectrometer from which a color is calculated) or spectral information of light emitted from the light fixture or a part thereof when each subtractive color filter is controlled according to the respective calibration control setpoint,
    storing corresponding values of:
      the calibration set of control setpoints, and
      the color (such as the color from the color meter or the color as calculated from the spectral information from the spectrometer) and/or spectral information of light emitted from the light fixture or a part thereof when each subtractive color filter is controlled according to the set of calibration control setpoints.

According to an embodiment, the light fixture system is arranged for obtaining calibration data repeatedly, such as for the purpose of continuously updating (and/or improving resolution).

There is also presented a calibration setup comprising:
a color meter or a spectrometer, wherein the light fixture is arranged for emitting light to the color meter or the spectrometer,
(said color meter or spectrometer optionally comprising) an integrating sphere, wherein the light fixture is arranged for emitting light into an input port of the integrating sphere, such as wherein the emitted light is emitted to the color meter or the spectrometer via the integrating sphere,
a control device is further arranged for, such as arranged for in a calibration mode,
controlling each subtractive color filter of an associated light fixture with a subtractive color mixing system, according to a respective calibration control setpoint,
obtaining calibration data, wherein said obtaining calibration data comprises, for one or more sets of calibration control setpoints comprising a calibration control setpoint for each subtractive color filter,
measuring with the color meter or spectrometer, respectively, a color (such as measuring the color directly with the color meter or indirectly via the spectrum of the spectrometer from which a color is calculated) or spectral information of light emitted from the light fixture or a part thereof when each subtractive color filter is controlled according to the respectice calibration control setpoint,
storing corresponding values of:
the calibration set of control setpoints, and
the color (such as the color from the color meter or the color as calculated from the spectral information from the spectrometer) and/or spectral information of light emitted from the light fixture or a part thereof when each subtractive color filter is controlled according to the set of calibration control setpoints.

In some embodiments, the color meter and/or the spectrometer can be arranged external to the light fixture or internal to the light fixture (such as enclosed by a lamp housing). An advantage of placement external to the light fixture may be that it enables simple removal subsequent to use and/or lower weight and cost of the light fixture. An advantage of placement internal to the light fixture may be that it enables a compact and integrated solution for the purpose of calibrating the light fixture (including calibration during use and after/between use(s)).

According to an embodiment, the method comprises measuring with the spectrometer spectral information of light emitted from the light fixture when each subtractive color filter is controlled according to the respectice calibration control setpoint, and furthermore comprises determining based on the spectral information a color of light emitted from the light fixture when each subtractive color filter is controlled according to the respectice calibration control setpoint, and still further comprises storing corresponding values of the calibration set of control setpoints, and the color (such as the color as calculated from the spectral information from the spectrometer) and/or spectral information of light emitted from the light fixture when each subtractive color filter is controlled according to the respective calibration control setpoint.

According to an embodiment there is presented multiple light fixture systems, wherein calibration data differs between one or more pairs of light fixture systems.

According to an embodiment there is presented a plurality, such as at least 2, at least 5, at least 10, at least 100, of light fixture systems, wherein a difference or standard deviation in a color of light upon having traversed the subtractive color mixing system and the additional filter, is smaller, such as at least 0.1% smaller, such as at least 1.0% smaller, such as at least 5% smaller, such as at least 10% smaller, such as at least 20% smaller, such as at least 30% smaller, such as at least 40% smaller, such as at least 50% smaller, such as at least 75% smaller, such as at least 90% smaller, than it would have been in the absence of the additional filter. For example, the control setpoints are tailored to each specific additional filter, so that while the optical output is quite similar with the (different) additional filters, the optical output would vary to a larger degree without the additional filters (all other things equal). Alternatively, while the optical output is quite similar with the (different) control settings, the optical output would vary to a larger degree without the subtractive color mixing systems (all other things equal). By a smaller percentage of, e.g., standard deviation, may be understood that a (possibly hypothetical) standard deviation of, e.g., colors (such as where a deviation of each light fixture system is based on a vector in a CIE system) of the plurality of light fixture systems in the absence of the additional filter is calculated and compared to a standard deviation with the additional filters, and where the standard deviation with the additional filters is a certain percentage smaller than a standard deviation without the additional filters.

According to an embodiment there is presented a plurality, such as at least 2, at least 5, at least 10, at least 100, of light fixture systems according to, wherein a change in target control setpoints is present upon a change in a setting of the additional filter is different between at least two light fixture systems. For example, for multiple light fixture systems, the control setpoints change upon changing an adjustment of the additional filter, yet they change differently for each light fixture system. An advantage of this may be that it enables taking into account specific deviations from nominal optical properties of the specific optical components of each light fixture system.

According to an embodiment there is presented a light fixture system wherein the light fixture is a moving head. A moving head may be understood to be a light fixture with rotating means, such as actuators, for rotating a direction of light emitted from the light fixture around one or two axes being orthogonal to the direction of light emitted from the light fixture. An example of such embodiment may be given by a moving head, such as described in WO2010/145658 (see for example FIGS. 1-2 and accompanying description), which is incorporated by reference herein.

According to an embodiment, there is presented a light fixture, such as a moving head, comprising one or more actuators, such as electric motors, such as stepper motors and/or servo motors, for changing a direction of light emitted from the light fixture, such as for rotating a direction of light emitted from the light fixture around one or two axes being orthogonal to the direction of light emitted from the light fixture. A possible advantage is that the direction of light can be changed in an automated manner, which may in particular be relevant for, e.g., theatre lighting, e.g., for stage performances. An example of such embodiment may be given by a moving head, such as described in WO2010/145658A1 (see for example FIGS. 1-2 and accompanying description), which is incorporated by reference herein.

According to an embodiment there is presented a light fixture system wherein the plurality of light sources (244) are capable of delivering in total at least 5 klm, such as at least 10 klm (i.e., ten thousand lumen or 10 kilolumen), such as at least 20 klm, such as at least 30 klm, such as at least 40 klm.

According to an embodiment there is presented a light fixture system wherein a luminance of each light source of the plurality of light sources (103) is above 250 lm/mm$^2$, such as above 300 lm/mm$^2$, such as above 400 lm/mm$^2$, such as above 450 lm/mm$^2$, such as above 500 lm/mm$^2$. According to an embodiment, there is presented an illumination device wherein a luminance of the second group of light sources can be driven above 250 lm/mm$^2$, such as above 300 lm/mm$^2$, such as above 400 lm/mm$^2$, such as above 500 lm/mm$^2$. For, e.g., profile light or other Etendue limited applications, source luminance may be important and relevant for how high an output can be reached for a certain size fixture. Luminance is understood to be for DC operation (not flash) and measured in lumen (lm) per square millimeter (mm$^2$).

According to fourth aspect, there is presented a method of manufacturing a light fixture system according to the third aspect wherein the method comprises:
  obtaining, such as measuring or calculating, error information regarding a color difference between
    a desired color (such as a target color applied during manufacturing), and
    a color of light emitted from the light fixture or a part thereof upon having traversed the additional filter,
  arranging the control device so that calculating a target control setpoint for each subtractive color filter within the plurality of subtractive color filters is based on said error information.

The term "desired color" is generally understood to refer to a desired color during manufacturing, which could in principle be any color, and could for example be chosen at or close to a typical or average value of a color resulting color from an average light source and an average additional filter. The term "error information" is geneally understood to refer to information enabling the deriving of a color difference. The color difference may, for example, be given as a vector in a colour space, such as a CIE colour space.

According to an embodiment there is presented a method of manufacture wherein the method further comprises:
  obtaining the calibration data wherein for a plurality of the sets of calibration control setpoints, the emitted color, such as the emitted color of the calibration data, is based on light not having traversed the additional filter,
  and wherein obtaining the error information comprises measuring the color of light emitted from the light fixture or a part thereof upon having traversed the additional filter,
  and wherein arranging the control device so that calculating a target control setpoint for each subtractive color filter within the plurality of subtractive color filters based on said error information comprises
    arranging the control device to calculate a target control setpoint for each subtractive color filter within the plurality of subtractive color filters which negates the color difference.

The calculation can be based on calibration data for light not having traversed the additional filter. The error information can be based on light having traversed the additional filter. The term "negates" may be generally understood to mean that the target control setpoints are chosen so that when the subtractive color mixing system is set accordingly and light (optionally emitted from the light source) traverses both the subtractive color mixing system and the additional filter, then the resulting color is the desired color. An advantage may be that this ensures homogeneity between light fixture systems because even differences in components and an interplay between them is overcome in a manner ensuring that each light source emits the same color of light, such as the desired colour of light or another (target) colour of light.

According to a fifth aspect, there is presented use of a light fixture system according to the third aspect for emitting a target color.

BRIEF DESCRIPTION OF THE DRAWINGS

The first, second, third, fourth and fifth aspect according to the disclosure will now be described in more detail with regard to the accompanying figures. The figures show one way of implementing the present disclosure and is not to be construed as being limiting to other possible embodiments falling within the scope of the attached claim set.

DETAILED DESCRIPTION

Figure 1:
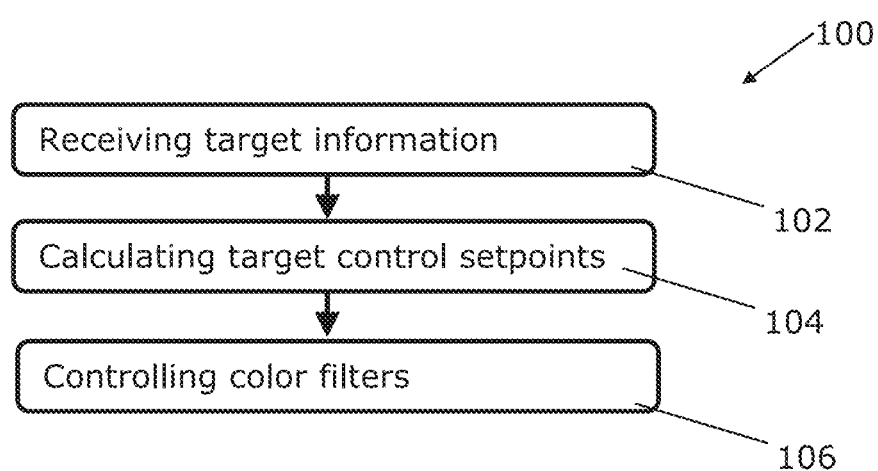
FIG. 1 shows a flow-chart of a method according to the disclosure.

FIG. 1 shows a flow-chart of a method 100 according to the disclosure for controlling a subtractive color mixing system in a light fixture, wherein
  the light fixture comprises
    a light source,
    the subtractive color mixing system, which comprises a plurality of subtractive color filters, and
    an additional filter,
  and wherein the method is for emitting light having a target color upon having traversed the additional filter, such as upon having traversed the subtractive color mixing system and the additional filter and optionally being emitted from the light fixture, said method comprising:
    receiving (102) target information indicative of, such as defining, the target color,
    calculating (104) a target control setpoint for each subtractive color filter within the plurality of subtractive color filters based on:
      the target information, and
      calibration data, which for a plurality of sets of calibration control setpoints is indicative of an emitted color, and
    controlling (106) each of the subtractive color filters according to each calculated target control setpoint for each of the subtractive color filters.

Figure 2:
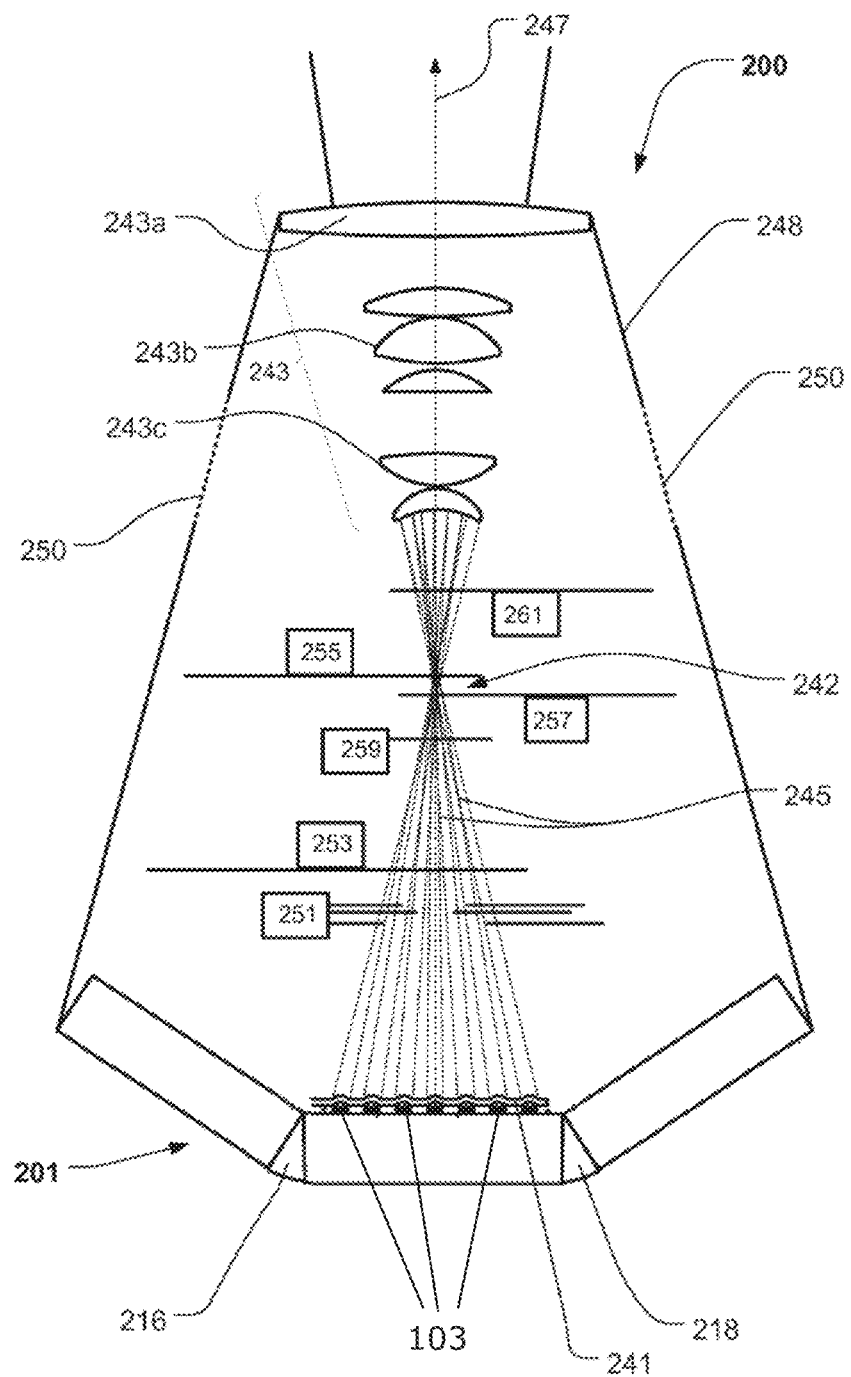
FIG. 2 illustrates a structural diagram of an illumination device.

FIG. 2 illustrates a structural diagram of an illumination device 200 (wherein "illumination device" and "light fixture" may be used interchangeably throughout the present application). The illumination device comprises a cooling module 201 comprising a plurality of LEDs 103 (which could in an alternative embodiment be one or more discharge bulbs), a light collector 241, an optical gate 242 and an optical projecting and zoom system 243. The cooling module is arranged in the bottom part of a lamp housing 248 of the illumination device and the other components are arranged inside the lamp housing 248. The lamp housing 248 can be provided with a number of openings 250. The light collector 241 is adapted to collect light from the LEDs 103 and to convert the collected light into a plurality of light beams 245 (dotted lines) propagating along an optical axis 247 (dash-dotted line). The light collector can be embodied as any optical means capable of collecting at least a part of the light emitted by the LEDs and convert the collected light to a light beams. In the illustrated embodiment the light collector comprises a number of lenslets each collecting light from one of the LEDs and converting the light into a corresponding light beam. However it is noticed that the light collector also can be embodied a single optical lens, a Fresnel lens, a number of TIR lenses (total reflection lenses), a number of light rods or combinations thereof. It is understood that light beams propagating along the optical axis contain rays of light propagating at an angle, e.g. an angle less that 45 degrees to the optical axis. The light collector may be configured to fill the optical the gate 242 with light from the light sources 103 so that the area, i.e. the aperture, of the gate 242 is illuminated with a uniform intensity or optimized for max output. The gate 242 is arranged along the optical axis 247. The optical projecting system 243 may be configured to collect at least a part of the light beams transmitted through the gate 242 and to image the optical gate at a distance along the optical axis. For example, the optical projecting system 243 may be configured to image the gate 242 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be contained within the gate 242 so that that the illuminated image can be imaged by the optical projecting system. Accordingly, the illumination device 200 may be used for entertainment lighting. In the illustrated embodiment the light is directed along the optical axis 247 by the light collector 241 and passes through a number of light effects before exiting the illumination device through a front lens 243a. The light effects can for instance be any light effects known in the art of intelligent/entertainments lighting for instance, a CMY subtractive color mixing system 251, color filters 253, gobos 255, animation effects 257, iris effects 259, a focus lens group 243c, zoom lens group 243b, prism effect 261, framing effects (not shown), or any other light effects known in the art. The mentioned light effects only serves to illustrate the principles of an illuminating device for entertainment lighting and the person skilled in the art of entertainment lighting will be able to construct other variations with additional are less light effects. Further it is noticed that the order and positions of the light effects can be changed.

It is understood that in the embodiment depicted in FIG. 2, the each of the color filters 253 may take the place at the additional filter. In an alternative embodiment, color filters 253 may be replaced with or supplemented with one or more of CTC filter(s), such as a CTB filter and/or a CTO filter, or a CRI enhancement filter.

Figure 3:
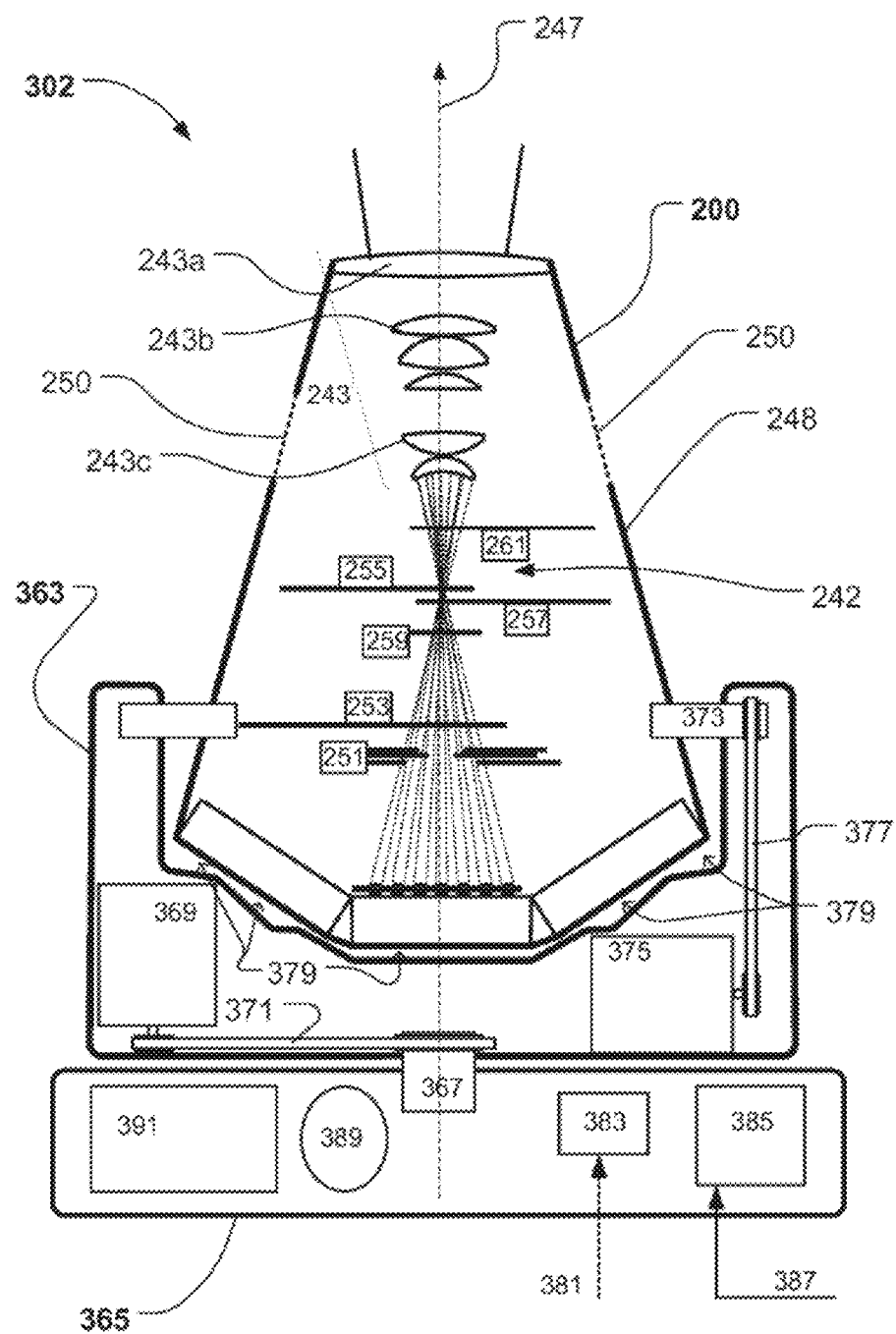
FIG. 3 illustrates a structural diagram of a moving head light fixture.

FIG. 3 illustrates a structural diagram of a moving head light fixture 302 comprising a head 200 rotatable connected to a yoke 363 where the yoke is rotatable connected to a base 365. The head is substantially identical to the illumination device shown in FIG. 2 and substantial identical features are labeled with the same reference numbers as in FIG. 2 and will not be described further. The moving head light fixture comprises pan rotating means for rotating the yoke in relation to the base, for instance by rotating a pan shaft 367 connected to the yoke and arranged in a bearing (not shown) in the base). A pan motor 369 is connected to the shaft 367 through a pan belt 371 and is configured to rotate the shaft and yoke in relation to the base through the pan belt. The moving head light fixture comprises tilt rotating means for rotating the head in relation to the yoke, for instance by rotating a tilt shaft 373 connected to the head and arranged in a bearing (not shown) in the yoke). A tilt motor 375 is connected to the tilt shaft 373 through a tilt belt 377 and is configured to rotate the shaft and head in relation to the yoke through the tilt belt. The skilled person will realize that the pan and tilt rotation means can be constructed in many different ways using mechanical components such as motors, shafts, gears, cables, chains, transmission systems, bearings etc. Alternatively it is noticed that it also is possible to arrange the pan motor in the base and/or arrange the tilt motor in the head. The space 379 between the yoke and the bottom part of the head is limited as the moving head light fixture is designed to be as small as possible. As known in the prior art the moving head light fixture receives electrical power 381 from an external power supply (not shown). The electrical power is received by an internal power supply 383 which adapts and distributes electrical power through internal power lines (not shown) to the subsystems of the moving head. The internal power system can be constructed in many different ways for instance by connecting all subsystems to the same power line. The skilled person will however realize that some of the subsystems in the moving head need different kind of power and that a ground line also can be used. The light source will for instance in most applications need a different kind of power than step motors and driver circuits. The light fixture comprises also a controller 385 which controls the components (other subsystems) in the light fixture based on an input signal 387 indicative light effect parameters, position parameters and other parameters related to the moving head lighting fixture. The controller receives the input signal from a light controller (not shown) as known in the art of intelligent and entertainment lighting for instance by using a standard protocol like DMX, Art-NET, RDM etc. Typically the light effect parameter is indicative of at least one light effect parameter related to the different light effects in the light system. The controller 385 is adapted to send commands and instructions to the different subsystems of the moving head through internal communication lines (not shown). The internal communication system can be based on a various type of communications networks/systems. The moving head can also comprise user input means enabling a user to interact directly with the moving head instead of using a light controller to communicate with the moving head. The user input means 389 can for instance be bottoms, joysticks, touch pads, keyboard, mouse etc. The user input means can also be supported by a display 391 enabling the user to interact with the moving head through a menu system shown on the display using the user input means. The display device and user input means can in one embodiment also be integrated as a touch screen.

Figure 4:
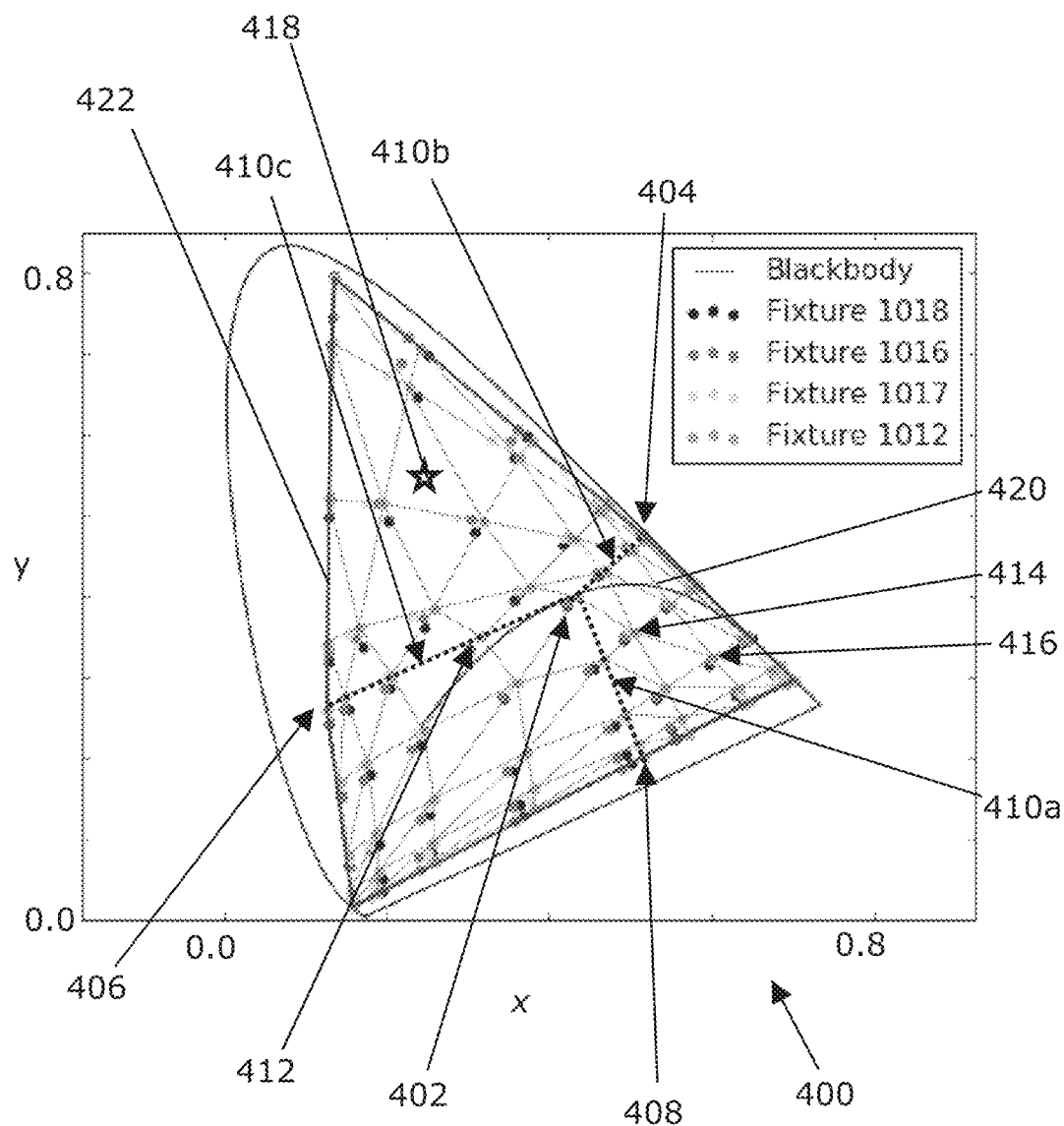
FIG. 4 shows a triangulated point set of color points in a calibration data set.

FIG. 4 shows a triangulated point set 400 (of color points in a calibration data set) in a CIE 1931 color space with a plurality of points of a set of calibration data, each point being representative of a color of light emitted from a (one of four) light fixtures (the light fixtures being named Fixture 1018, Fixture 1016, Fixture 1017 and Fixture 1012, cf., the legend in the figure) when each subtractive color filter in the light fixture is controlled according to a respectice calibration control setpoint. The figure also shows the black body line 420 as a full drawn line. The achievable color gamut is defined by the outer edges of the measured points, shown as a thick fully drawn line 422.

Furthermore, point set mesh generation within the color space has been carried out for one fixture (Fixture 1012) based on the calibration data, such as wherein calibration data points form vertices, wherein the point set mesh generation is a point set triangulation.

For example, the subtractive color mixing system may comprise three color filters, and the point mesh generation is triangulation wherein any mesh polygon comprise vertices which have no more than two filters inserted in the optical path. FIG. 4 depicts such embodiment, wherein a subtractive CMY (cyan, magenta, yellow) color mixing system has been calibrated (for four light fixtures) to give the depicted point sets, which have been triangulated. The calibration data of FIG. 4 comprises for each combination of two filters in the set of three filters (i.e., three combinations) any combination of 5 possible setting for each filter, i.e., the plurality of sets of calibration control setpoints comprises 75 sets (i.e., 3 combinations of two filters with 5 times 5 settings for each combination of filters, i.e., $3 \times 5^2$ sets). FIG. 4 shows the no-filter calibration control setpoint 402 where each calibration control setpoint corresponds to substantially zero, such as zero, subtraction of light by the corresponding subtractive color filter, which is effectively the color of the lamp of the light fixture, which in the present example lies on or near the black body line 420. The calibration data of FIG. 4 also comprises, for each of a plurality of subtractive color filters, sets of calibration control setpoins where the calibration controll setpoint for the subtractive color filter corresponds to non-zero, such as substantial, subtraction of light, and the calibration control setpoint for all other subtractive color filters within the plurality of subtractive color filters corresponds to substantially zero, such as zero, subtraction of light, such as sets of calibration control setpoints with only one color filter fully inserted (such as inserted to the maximum extent possible in the specific implementation) in the optical path, such as the yellow-filter calibration control setpoint 404 (with only the yellow filter fully inserted), the cyan-filter calibration control setpoint 406 (with only the cyan filter fully inserted) and the magenta-filter calibration control setpoint 408 (with only the magenta filter fully inserted). Each dotted line 410a, 410b, 410c shows, respectively, a line in the color space corresponding to gradually increasing (away from the no-filter calibration control setpoint 402) insertion of a single color filter. FIG. 4 also shows color points corresponding to sets of mixed calibration control setpoints wherein a plurality of calibration control setpoints each corresponds to non-zero, such as substantial, subtraction of light, for example a first color point 414 and a second color point 416. Furthermore, the corresponding colors i.e., cf., first color point 414 and second color point 416, of light emitted from the light fixture according to the plurality of sets of mixed calibration control setpoints have different distances in a color space with respect to a color (cf., the no-filter color point 402) for which each setpoint corresponds to substantially zero, such as zero, subtraction of light by the corresponding subtractive color filter. In other words, the first color point 414 is closer to color point 402 compared to color point 416. Still further, for the sets of mixed calibration control setpoints with corresponding emitted colors at different distances in a color space, the same two calibration control setpoints are non-zero (such as for these two calibration control setpoints, the same two filters are inserted in the optical path), such as where only these two control calibration setpoints are non-zero, such as wherein the two corresponding color points 414, 416 are between the same two dotted lines, such as lines 410a, 410b.

FIG. 4 also shows an exemplary target color, as indicated by star 418, which is not coinciding with a color of a set of calibration control setpoints (such as the star not coinciding with any rounded marker, but is rather within the triangles or on the edges between the rounded markers, and in this example being placed entirely within a triangle in the triangulated mesh).

According to an embodiment, calculating a target control setpoint for each subtractive color filter within the plurality of subtractive color filters based on the target information and calibration data which for a plurality of sets of calibration control setpoints is indicative of an emitted color, may comprise identifying the set of calibration control setpoints with a corresponding color being closest to the target color and setting the target control setpoint for each color filter as equal to the corresponding calibration control setpoint of said (nearest) set of calibration control setpoints. This may be advantageous for its simplicity (e.g., renders point mesh generation superfluous) and may in particular work well for high-resolution calibration data (such as calibration data with a high number of calibration control setpoints, which colors which are well-distributed in color space) and/or where requirements for (exact) color reproduction is relatively relaxed. In a further embodiment, calculating a target control setpoint for each subtractive color filter within the plurality of subtractive color filters based on the target information and calibration data which for a plurality of sets of calibration control setpoints is indicative of an emitted color, may comprise identifying the (plurality of) sets of calibration control setpoints with a corresponding color being closest (or nearest) to the target color and setting the target control setpoint for each color filter based on said (nearest) sets of calibration control setpoints, such as by relying on nearest-neighbour interpolation.

According to another embodiment, calculating a target control setpoint for each subtractive color filter within the plurality of subtractive color filters may comprise determining a mesh polygon (after point mesh generation), such as the smallest mesh polygon, comprising the target color, such as by optionally repeatedly applying a method for determining if the target color is within a mesh polygon. Once the (smallest) mesh polygon comprising the target color has been identified, the target control setpoints are identified by interpolating, such as performing linear triangle interpolation within the mesh polygon based on the vertices of the mesh polygon, so as to achieve target control setpoints. For example, each vertice may be associated with three scalar values, corresponding to the calibration control setpoint for each filter, and the a linear triangle interpolation may be carried out for the calibration control setpoint for each filter resulting in a set of target control setpoints with a target control setpoint for each filter.

According to a still further embodiment, the set of target control setpoints may be obtained by any means, e.g., non-linear interpolation, taking multiple points on either side into account, extrapolation by multiple points, etc.

Figure 5:
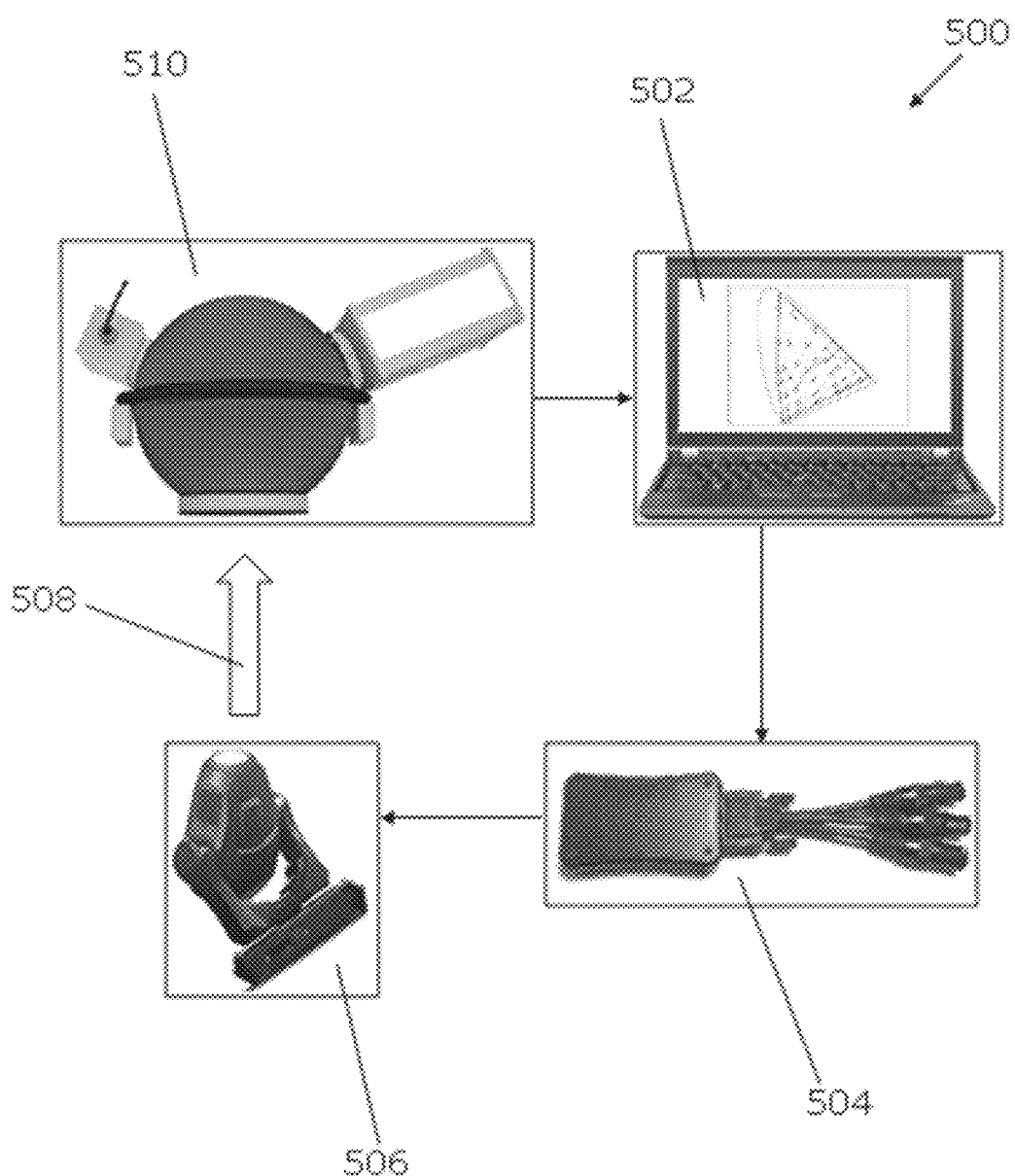
FIG. 5 shows an overview of a light fixture system.

FIG. 5 shows an overview of a light fixture system 500, such as a calibration setup, said light fixture system comprising a light fixture 506 comprising a light source, a subtractive color mixing system, wherein the subtractive color mixing system comprises a transducer for controlling the subtractive color filters upon receipt of target control setpoints, and a control device 502, wherein the control device is operationally connected to the subtractive color mixing system and arranged for controlling the subtractive color mixing system by outputting calculated target control setpoints to the transducer controlling respective subtractive color filters. In more detail, a controlling device 502 sets and submits consecutively—via an interface 504, e.g., a USB-to-DMX interface (which is a serial digital interface adapter to connect a computer to one or more fixtures)—to a light fixture 506 sets of control setpoints for controlling each color filter of a subtractive color mixing system of the light fixture 506, whereupon the light fixture emits light 508 accordingly, and a light measuring device, which in the presently depicted embodiment is exemplified by an integrating sphere 510 comprising a color meter or a spectrometer and wherein optionally the emitted light (from the light fixture) is emitted to the color meter or the spectrometer via the integrating sphere, is arranged for receiving light 508 emitted from the a lighting fixture. Software is thus used to control the lighting fixture 506 (through an interface 504) and measurement equipment such that the light spectrum is measured for a number of different configurations of the subtractive color filters. The measurements may form calibration measurements, are sent from the integrating sphere 510 to the controlling device 502, which can then determine colors and triangulate a color space accordingly. Subsequently, the controlling device can utilize the the calibration data to (e.g., via a color engine algorithm) to determine one or more control setpoints that produces one or more target colors.

Figure 6:
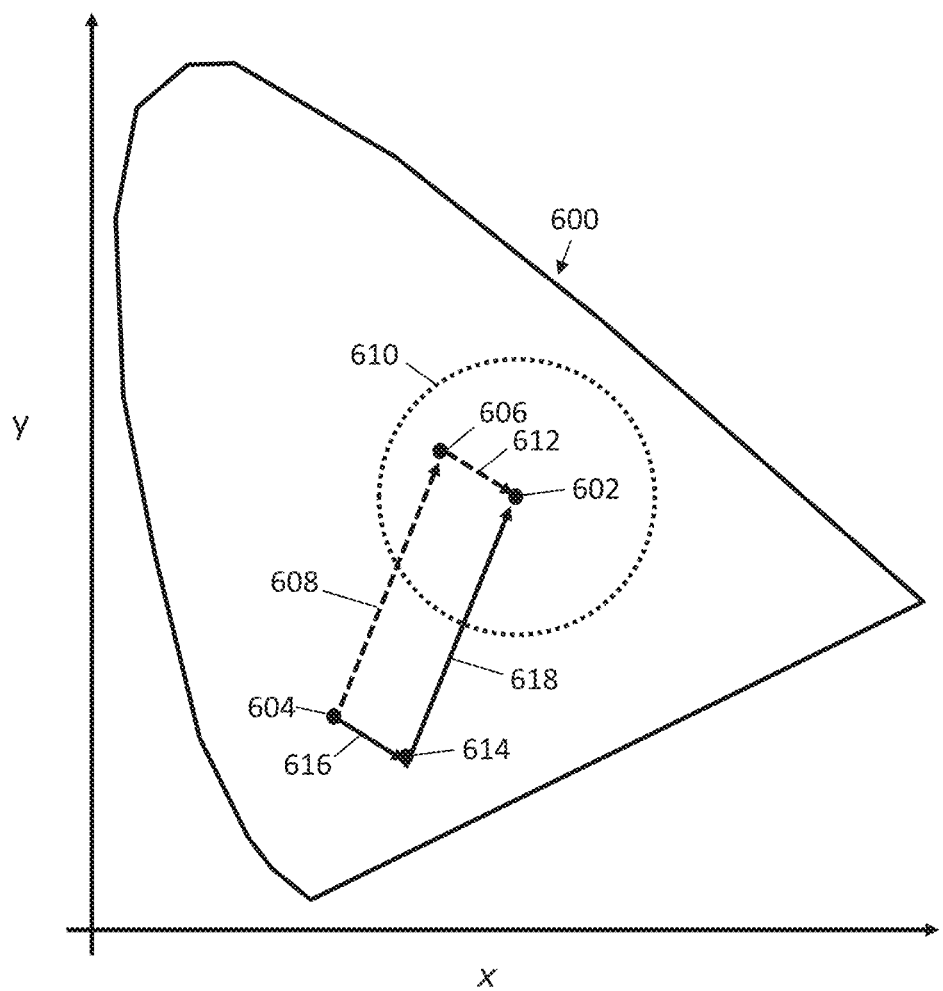
FIG. 6 illustrates color adjustment during manufacture of a light fixture system.

FIG. 6 illustrates steps for adjusting color during manufacture of a a light fixture system, such as the light fixture system according to the third aspect. In some embodiments, the steps enable the control device to calculate target control setpoints for the purpose of enabling emitting light having a desired color 602 after having traversed the subtractive color system and the additional filter), which in FIG. 6 is illustrated in the context of a color space 600, such as a CIE color space. As shown, the steps include:

- obtaining calibration data wherein for a plurality of the sets of calibration control setpoints, the emitted color, such as the emitted color of the calibration data, is based on light having traversed the subtractive color mixing system and not having traversed the additional filter,
- determining starting control setpoints describing a color 604, such as without any of the subtractive color filters traversed,
- measuring a color of light 606 (where the additional filter changes the color of light 604 to the color of light 606 as indicated by dashed arrow 608, which due to production tolerances could be anywhere within a relatively large color area 610) emitted from the light fixture or a part thereof upon having traversed the additional filter and not having traversed the subtractive color mixing system,
- determining an error information as an error vector 612, between
  - the desired color 602, and
  - the color of light 606, emitted from the light fixture or a part thereof upon having traversed the additional filter and not having traversed the subtractive color mixing system,
- arranging the control device to calculate a target control setpoint for each subtractive color filter within the plurality of subtractive color filters which negates the error vector, such as said target control setpoint bring the color 604 to the color 614 (as indicated by the arrow 616), which will be advantageous due to the additional filter then bringing the color, to the desired color 602 (as indicated by the arrow 618).

Although the present disclosure has been described in connection with the specified embodiments, it should not be construed as being in any way limited to the presented examples. The scope of the present disclosure is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the disclosure. Furthermore, individual features mentioned in different claims, may possibly be advantageously combined, and the mentioning of these features in different claims does not exclude that a combination of features is not possible and advantageous.

What is claimed is:

1. A method for controlling a subtractive color mixing system in a light fixture generating light, wherein
   the light fixture comprises:
      a light source, and
      the subtractive color mixing system, which comprises a plurality of subtractive color filters, and
      an additional filter that is not included in the subtractive color mixing system, wherein the additional filter changes at least one of a color, a color temperature, or a color rendering index of light that traverses the additional filter, and
   said method comprising:
      receiving target information indicative of a target color,
      calculating a target control setpoint for each subtractive color filter within the plurality of subtractive color filters based on:
         the target information,
         a setting that corresponds to an amount of the light generated by the light fixture that traverses the additional filter, and
         calibration data, which for a plurality of sets of calibration control setpoints is indicative of an emitted color, wherein the plurality of sets of calibration control setpoints comprises a set of calibration control setpoints, where each calibration control setpoint corresponds to a color value that would pass through a corresponding subtractive color filter with zero subtraction of light by the corresponding subtractive color filter, and wherein for one or more of the sets of calibration control setpoints, the emitted color is defined by light having traversed the subtractive color mixing system and not having traversed the additional filter and supplemental calibration data obtained for light having traversed the additional filter,
      controlling each of the subtractive color filters according to each calculated target control setpoint for each of the subtractive color filters, and
      emitting the light having the target color upon the light having traversed the subtractive color mixing system and the additional filter.

2. The method of claim 1, wherein for one or more of the sets of calibration control setpoints, the emitted color is defined by light having traversed the subtractive color mixing system and the additional filter.

3. The method of claim 1, wherein for one or more of the sets of calibration control setpoints, the emitted color is based on light having traversed the subtractive color mixing system and not having traversed the additional filter.

4. The method of claim 1, wherein:
for a plurality of the sets of calibration control setpoints, the emitted color is based on light having traversed the subtractive color mixing system and not having traversed the additional filter, and
for one or more of the sets of calibration control setpoints, the emitted color is defined by light having traversed the subtractive color mixing system and the additional filter.

5. The method of claim 1, wherein:
for a plurality of the sets of calibration control setpoints, the emitted color is based on light having traversed the subtractive color mixing system and not having traversed the additional filter, and
for one or more of the sets of calibration control setpoints, the emitted color is defined by light having traversed the additional filter and not having traversed the subtractive color mixing system.

6. The method of claim 1, wherein the calibration data comprises a number N of sets of calibration control setpoints, wherein N is greater than one.

7. The method of claim 6, wherein the plurality of sets of calibration control setpoints comprises, for each of a plurality of subtractive color filters, a set of calibration control setpoints wherein:
the calibration control setpoint for the subtractive color filter corresponds to non-zero subtraction of light, and
the calibration control setpoint for all other subtractive color filters within the plurality of subtractive color filters corresponds to zero subtraction of light.

8. The method of claim 6, wherein the plurality of sets of calibration control setpoints comprises, one or more sets of mixed calibration control setpoints wherein:
a plurality of calibration control setpoints each corresponds to non-zero subtraction of light.

9. The method of claim 6, wherein:
the plurality of sets of calibration control setpoints comprises a plurality of mixed calibration control setpoints;
a plurality of calibration control setpoints each corresponds to non-zero subtraction of light; and corresponding colors of light emitted from the light fixture according to the plurality of sets of mixed calibration control setpoints have different distances in a color space, such as the CIE 1931 color space, with respect to a color for which each setpoint corresponds to zero subtraction of light by a corresponding subtractive color filter.

10. The method of claim 1, wherein for one or more of the sets of calibration control setpoints, the emitted color is defined by light originating from the light source and having traversed at least one of the subtractive color mixing system and the additional filter.

11. A light fixture system, comprising:
a light fixture that generates light comprising:
a light source,
a subtractive color mixing system, wherein the subtractive color mixing system comprises a plurality of subtractive color filters and a transducer for controlling the subtractive color filters upon receipt of target control setpoints, and
an additional filter that is not included in the subtractive color mixing system, wherein the additional filter changes at least one of a color, a color temperature, or a color rendering index of light that traverses the additional filter, and a control device arranged for:
receiving target information indicative of a target color, said target color being representative of a desired color of light upon having traversed the additional filter,
calculating a target control setpoint for each subtractive color filter within the plurality of subtractive color filters based on:
the target information,
a setting that corresponds to an amount of the light generated by the light fixture that traverses the additional filter, and
calibration data, which for a plurality of sets of calibration control setpoints is indicative of an emitted color, wherein the plurality of sets of calibration control setpoints comprises a set of calibration control setpoints, where each calibration control setpoint corresponds to a color value that would pass through a corresponding subtractive light filter with zero subtraction of light by the corresponding subtractive color filter, and wherein for one or more of the sets of calibration control setpoints, the emitted color is defined by light having traversed the subtractive color mixing system and not having traversed the additional filter and supplemental calibration data obtained for light having traversed the additional filter
outputting calculated target control setpoints enabling controlling each of the subtractive color filters according to each calculated target control setpoint for each of the subtractive color filters, and
emitting the light having the target color upon the light having traversed the subtractive color mixing system and the additional filter;
wherein the control device is operationally connected to the subtractive color mixing system and arranged for controlling the subtractive color mixing system by outputting calculated target control setpoints to the transducer controlling respective subtractive color filters.

12. The light fixture system of claim 11, wherein the additional filter is selected as any of the following:
a color-temperature-compensation (CTC) filter,
a color-to-orange (CTO) filter,
a color-to-blue (CTB) filter,
a color-rendering index (CRI) enhancement filter, or
a color filter.

13. The light fixture system of claim 11, wherein the additional filter is adjustable.

14. The light fixture system of claim 11, further comprising:
a second light fixture comprising:
a second light source,
a second subtractive color mixing system, wherein the second subtractive color mixing system comprises a plurality of second subtractive color filters and a second transducer for controlling the second subtractive color filters upon receipt of target control setpoints, and
a second additional filter that is not included in the subtractive color mixing system, wherein the additional filter changes at least one of a color, a color temperature, or a color rendering index of light that traverses the additional filter, and a second control device arranged for:
receiving target information indicative of a target color, the target color being representative of a desired color of light upon having traversed the second additional filter,
calculating a target control setpoint for each second subtractive color filter within the plurality of second subtractive color filters based on:
the target information,
a setting of the second additional filter, and
calibration data, which for a plurality of sets of calibration control setpoints is indicative of an emitted color, and
outputting calculated target control setpoints enabling controlling each of the second subtractive color filters according to each calculated target control setpoint for each of the second subtractive color filters,
wherein the second control device is operationally connected to the second subtractive color mixing system and arranged for controlling the second subtractive color mixing system by outputting calculated target control setpoints to the second transducer controlling respective second subtractive color filters,
wherein a change in target control setpoints is present upon a change in the setting of the additional filter of the control device is different from the setting of the second additional filter of the second control device.

15. The light fixture system of claim 14, wherein a difference or standard deviation in a color of light upon having traversed the subtractive color mixing system and the additional filter, is smaller than it would have been in the absence of the additional filter.

16. A method of manufacturing a light fixture system comprising:
a light fixture that generates light comprising:
a light source,
a subtractive color mixing system, wherein the subtractive color mixing system comprises a plurality of subtractive color filters and a transducer for controlling the subtractive color filters upon receipt of target control setpoints, and
an additional filter that is not included in the subtractive color mixing system, wherein the additional filter changes at least one of a color, a color temperature, or a color rendering index of light that traverses the additional filter, and
a control device arranged for:
receiving target information indicative of a target color, the target color being representative of a desired color of light upon having traversed the additional filter,
calculating a target control setpoint for each subtractive color filter within the plurality of subtractive color filters based on:
the target information,
a setting that corresponds to an amount of light generated by the light fixture that traverses the additional filter, and
calibration data, which for a plurality of sets of calibration control setpoints is indicative of an emitted color, wherein the plurality of sets of calibration control setpoints comprises a set of calibration control setpoints, where each calibration control setpoint corresponds to a color value that would pass through a corresponding subtractive color filter with zero subtraction of light by the corresponding subtractive color filter, and wherein for one or more of the sets of calibration control setpoints, the emitted color is defined by light having traversed the subtractive color mixing system and not having traversed the additional filter and supplemental calibration data obtained for light having traversed the additional filter, and
outputting calculated target control setpoints enabling controlling each of the subtractive color filters according to each calculated target control setpoint for each of the subtractive color filters;
wherein the control device is operationally connected to the subtractive color mixing system and arranged for controlling the subtractive color mixing system by outputting calculated target control setpoints to the transducer controlling respective subtractive color filters;
wherein the method comprises:
obtaining error information regarding a color difference between
a desired color, and
a color of light emitted from the light fixture or a part thereof upon having traversed the additional filter, and
arranging the control device so that calculating a target control setpoint for each subtractive color filter within the plurality of subtractive color filters is based on said error information.

17. The method of manufacturing of claim 16, wherein the method further comprises:
obtaining the calibration data wherein for a plurality of the sets of calibration control setpoints, the emitted color is based on light not having traversed the additional filter, and
wherein obtaining the error information comprises
measuring the color of light emitted from the light fixture or a part thereof upon having traversed the additional filter, and
wherein arranging the control device so that calculating a target control setpoint for each subtractive color filter within the plurality of subtractive color filters based on said error information comprises
arranging the control device to calculate a target control setpoint for each subtractive color filter within the plurality of subtractive color filters which negates the color difference.

* * * * *